Oct. 31, 1961 L. G. SOMMER 3,006,273
ADJUSTABLE ROTARY SPACER
Filed May 1, 1959

INVENTOR
LAWRENCE G. SOMMER

BY *Robert L. Sumner*
ATTORNEY.

United States Patent Office 3,006,273
Patented Oct. 31, 1961

3,006,273
ADJUSTABLE ROTARY SPACER
Lawrence George Sommer, 1765 Edgewood Road,
Redwood City, Calif.
Filed May 1, 1959, Ser. No. 810,380
3 Claims. (Cl. 101—114)

This invention relates to the art of measuring devices and deals particularly with a traveling machine for measuring and marking predetermined points on surfaces such as fabrics, soil, construction surfaces and the like.

The instrument to be described and claimed hereinafter has been developed primarily to meet a need in the drapery art, and will be described with that thought in mind. However, it will be obvious that the same device, with slight modification, which will be shown and described, may be used in other fields such as gardening, building construction, etc.

The primary object of the invention disclosed herein is to provide a measuring machine that will measure a plurality of predetermined distances and will mark them on a surface at the same time.

To make the machine more useful, I have incorporated means for varying the distances measured.

Briefly stated, the invention in its preferred form consists of a wheel rotatably mounted in a forked handle. The wheel carries a detachable container filled with chalk dust, or the like, mounted on the inside of the rim with suitable openings in the rim to permit droppings to pass through the rim to the surface being marked. Means is provided for adjusting the circumference of the wheel to vary the distance between marks.

Another object is to provide a light, durable and accurate adjustable rotary space marker that is easily and quickly changed to various spacings and one which may be used with facility on a drapery layout.

Other objects and advantages will become apparent as the description proceeds in conjunction with the drawing in which.

The concept of this invention is based on the use of a segment of a coiled spring such as a clock spring to form the rim of a wheel, in combination with spring members used as spokes, and means for varying the diameter of the wheel.

Figures 1, 6:
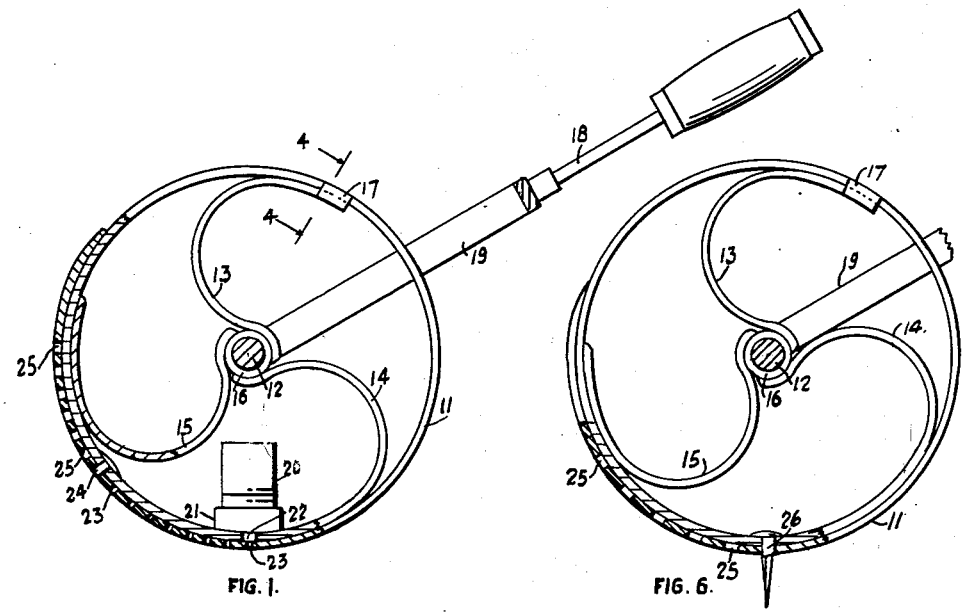
FIG. 1 is a side view, partly in section, of the preferred form of my invention.
FIG. 6 shows another form of my invention which may be used to mark surfaces such as soil.
Figures 2, 3, 4:
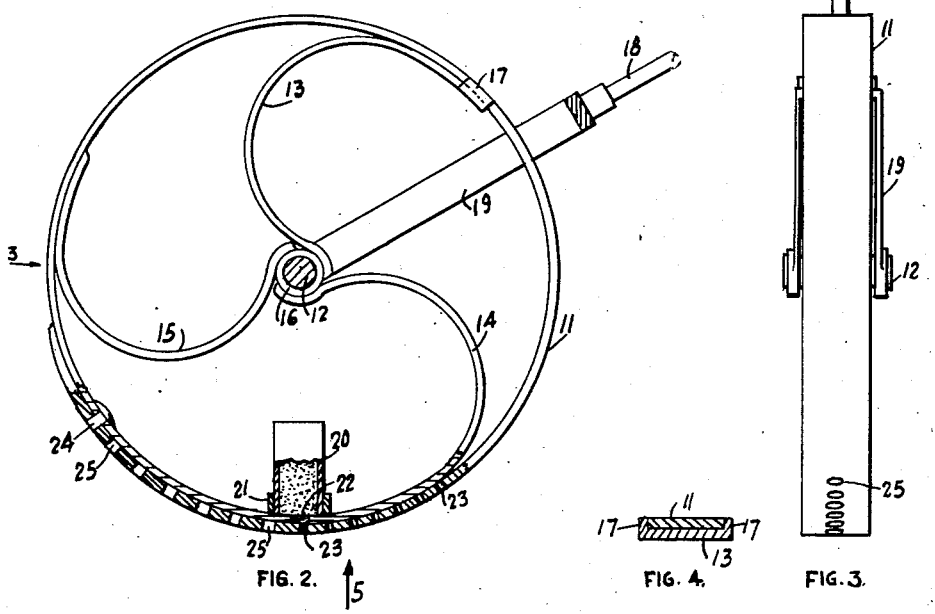
FIG. 2 is a view similar to FIG. 1 showing how the wheel may be varied in diameter.
FIG. 3 is a view taken in the direction of the arrow 3 in FIG. 2.
FIG. 4 is a section taken on line 4—4 of FIG. 1.
Figure 5:
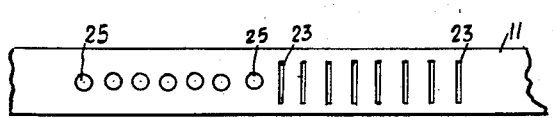
FIG. 5 is a plan view taken in the direction of the arrow 5 in FIG. 2.

Referring to the drawings, FIGS. 1, 2 and 6 will show the construction. Here it will be seen that the rim 11 is composed of a segment of a clock spring that overlaps varying degrees depending on the way the rim is set for the required diameter of the wheel. The rim 11 is mounted on an axle 12 by spokes 13, 14 and 15. Spokes 13 and 15 are short sections of a coiled spring and have a sliding engagement with the inner side of the rim, while spoke 14 is the inner end of the coiled spring forming the rim 11. This construction furnishes an anchor post for the spring segment forming the wheel. All the spokes are connected at their inner ends to a bearing sleeve 16 in any suitable manner such as by welding, which in turn, is rotatably mounted on the axle 12. The spoke 13 carries at its outer end side flanges 17 for holding the rim true while sliding engagement between the outer end of the spoke and the rim takes place. The spoke 15 is optional, since the wheel will work with two spokes only and in this case the extra spoke serves to effect a sliding engagement with the inner side of the rim at a third point.

A handle 18 with a forked construction 19 is rotatably connected to the axle 12 for rolling the wheel over the surface to be measured.

On the inside of the rim of the wheel, I mount an open ended container 20, which for purposes of loading is screw threaded into a collar 21. The collar 21 is mounted over a slot 22 in the inner coil of the rim which coincides with a slot 23 in the outer coil of the spring forming the rim of the wheel. There is a plurality of such slots which may be made to individually coincide with the hole or slot 22. For this purpose, I provide a pin 24 fixed in the inner run of the coil which extends outwardly enough to extend through holes 25 in the outer run of the coil forming the rim 11 thus providing a means for locking the inner run and the outer run of the coil in various positions. There is a plurality of the holes 25 corresponding to the number of slots 23.

In practice, the diameter of the wheel is set to meet the requirements of the spacing desired. After the container 20 is filled with chalk dust or any other suitable material the apparatus is ready for use in the ordinary manner of rolling the wheel over the surface. To change the diameter of the wheel, the operator lifts the outer coil of the spring off the pin 24 and allows the coil spring to expand to the point desired where he brings the pin 24 through another hole 25. This operation will bring another slot 23 beneath the slot 22, and the wheel will be ready to roll again with a different circumference which will change the spacing of the markings of the wheel.

The coil spring 11 is under compression even when fully expanded, and the spokes are likewise under compression at all times.

In FIG. 6, I have shown another form of my invention for marking a series of spaced points on surfaces other than fabrics. This form will be useful in marking plantings in soil, or the like. The construction is the same as shown in the other form, with the exception that no chalk dust or other material is used for marking. Instead of dropping material on the surface being measured, I provide a pointed pin 26 in place of the pin 24. This pin is adapted to use the same holes 25 for varying the diameter of the wheel and may be made interchangeable with pin 24. In this case, the slots 23 are not used.

A device of the foregoing character will find particular usefulness in marking drapes for pleating and also in the other fields mentioned.

I claim:

1. An adjustable rotary spacer comprising a segment of a coiled spring having its ends overlapping to form the rim of a wheel, a hub for said wheel, a plurality of spring pressed extensible spokes for connecting said rim to said hub, there being a slot through one of said overlapping ends of said coiled spring segment and a plurality of slots through the other overlapped end of said coiled spring segment, means for selectively registering individual slots of said plurality of slots with said first mentioned slot to vary the circumference of said rim and form an opening therethrough, means for mounting a container on the inside of said rim for dropping suitable material through said opening to form marks on a surface when said wheel is rolled thereover, and means connected to said hub for rolling said wheel over a surface.

2. The elements of claim 1 wherein the means for selectively registering individual slots of said plurality of slots with said first mentioned slot comprises a pin extending through one of said overlapping ends of said coiled spring segment into holes provided in the other overlapping end of said coiled spring segment, said holes being spaced to correspond to respective holes in said plurality of holes.

3. An adjustable rotary spacer comprising a segment of a coiled spring having its ends overlapped to form the rim of a wheel, a hub for said wheel, a plurality of spring pressed extensible spokes for connecting said rim to said hub, a pin mounted in one of the said overlapped ends of said coiled spring extending outwardly therefrom for making marks in the surface over which said wheel is rolled, there being a plurality of holes in the other of said overlapped ends of said coiled spring adapted to receive said pin to vary the circumference of said rim to change the spacing of said marks.

References Cited in the file of this patent

UNITED STATES PATENTS

| | | |
|---|---|---|
| 1,707,149 | Stamper | Mar. 26, 1929 |
| 2,236,233 | Erikson | Mar. 25, 1941 |
| 2,674,939 | Brengman | Apr. 13, 1954 |